(12) United States Patent
Hermander

(10) Patent No.: US 6,244,587 B1
(45) Date of Patent: Jun. 12, 2001

(54) SINGLE SHEET FEEDING DEVICE AND A SCANNER EQUIPPED WITH SUCH A DEVICE

(75) Inventor: Göran Hermander, Värmdö(SE)

(73) Assignee: Tekniko Design AB (SE)

( * ) Notice: Subject to any disclaimer, the term of this patent is extended or adjusted under 35 U.S.C. 154(b) by 0 days.

(21) Appl. No.: 09/308,980

(22) PCT Filed: Nov. 27, 1997

(86) PCT No.: PCT/SE97/01994

§ 371 Date: May 28, 1999

§ 102(e) Date: May 28, 1999

(87) PCT Pub. No.: WO98/23512

PCT Pub. Date: Jun. 4, 1998

(30) Foreign Application Priority Data

Nov. 28, 1996 (SE) ..................................... 9604388

(51) Int. Cl.[7] ................. B65H 3/04; B65H 3/52
(52) U.S. Cl. ................. 271/34; 271/124; 271/125
(58) Field of Search ................. 271/34, 124, 125

(56) References Cited

U.S. PATENT DOCUMENTS

| 3,831,928 | | 8/1974 | Davis . | |
|---|---|---|---|---|
| 3,838,851 | | 10/1974 | Kolibas . | |
| 4,557,472 | * | 12/1985 | Hannon | 271/133 X |
| 4,606,535 | * | 8/1986 | Larson | 271/10 X |
| 4,718,809 | * | 1/1988 | Krasuski et al. | 414/129 X |
| 4,978,115 | | 12/1990 | Sata et al. . | |
| 4,991,831 | * | 2/1991 | Green | 271/121 X |
| 5,011,124 | * | 4/1991 | Sardano et al. | 271/35 X |
| 5,201,508 | * | 4/1993 | Kuo | 271/10 X |
| 5,244,198 | * | 9/1993 | Green | 271/125 |
| 5,249,788 | * | 10/1993 | Helmstader | 271/10 X |
| 5,269,505 | * | 12/1993 | Sardano | 271/121 X |
| 5,451,038 | * | 9/1995 | Hosking et al. | 271/3.01 X |
| 5,642,877 | * | 7/1997 | Green | 271/35 X |
| 6,017,031 | * | 1/2000 | Oosawa et al. | 271/121 X |

FOREIGN PATENT DOCUMENTS

| 3032082 A1 | 4/1981 | (DE) . |
|---|---|---|
| 1029294 | 5/1966 | (GB) . |
| 2170484A | 8/1996 | (GB) . |
| WO 92/12085 | 7/1992 | (WO) . |

OTHER PUBLICATIONS

International Search Report; International Patent Application No.: PCT/SE97/01994.

* cited by examiner

Primary Examiner—Christopher P. Ellis
Assistant Examiner—Kenneth W Bower
(74) Attorney, Agent, or Firm—Banner & Witcoff, Ltd.

(57) ABSTRACT

A sheet feeder for advancing paper sheets one by one, has at least one traveling feeder belt whose one side is a feed plane and a stationary sheet restraining or retarding element that has a friction surface that faces towards and is spaced from the feed plane. The space between the friction surface and the feed plane forms a feed opening whose gap decreases in the feed direction. The feed belt runs on a belt support that is stationary, flat and rigid and extends along the greater part of the feed opening in the sheet transporting direction.

18 Claims, 2 Drawing Sheets

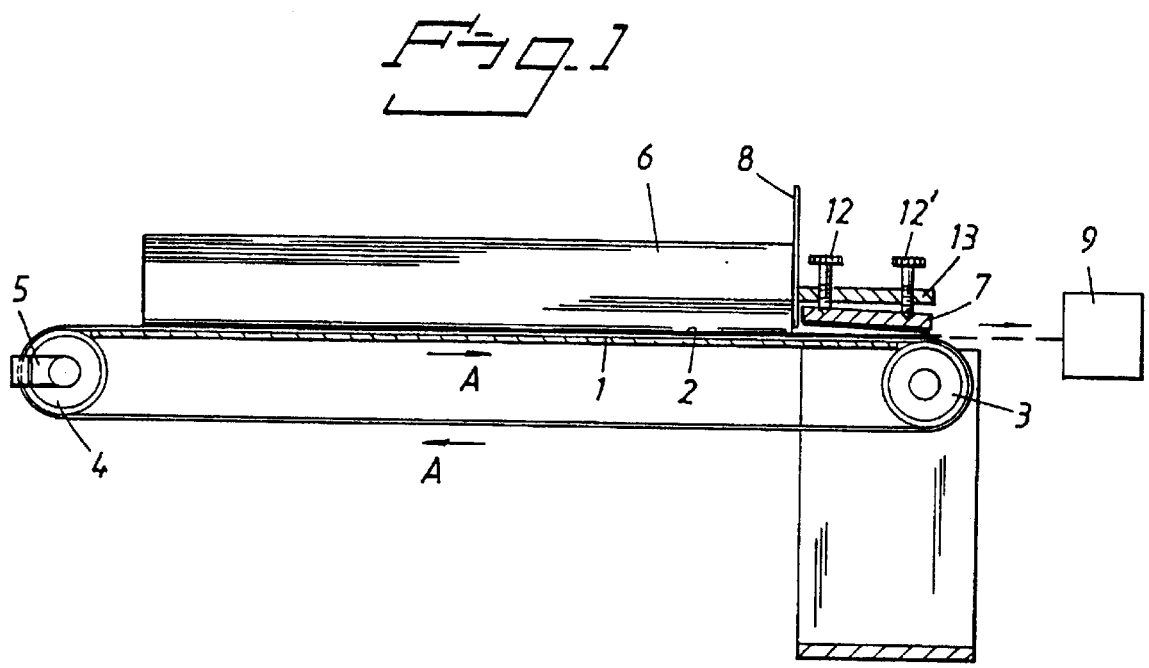
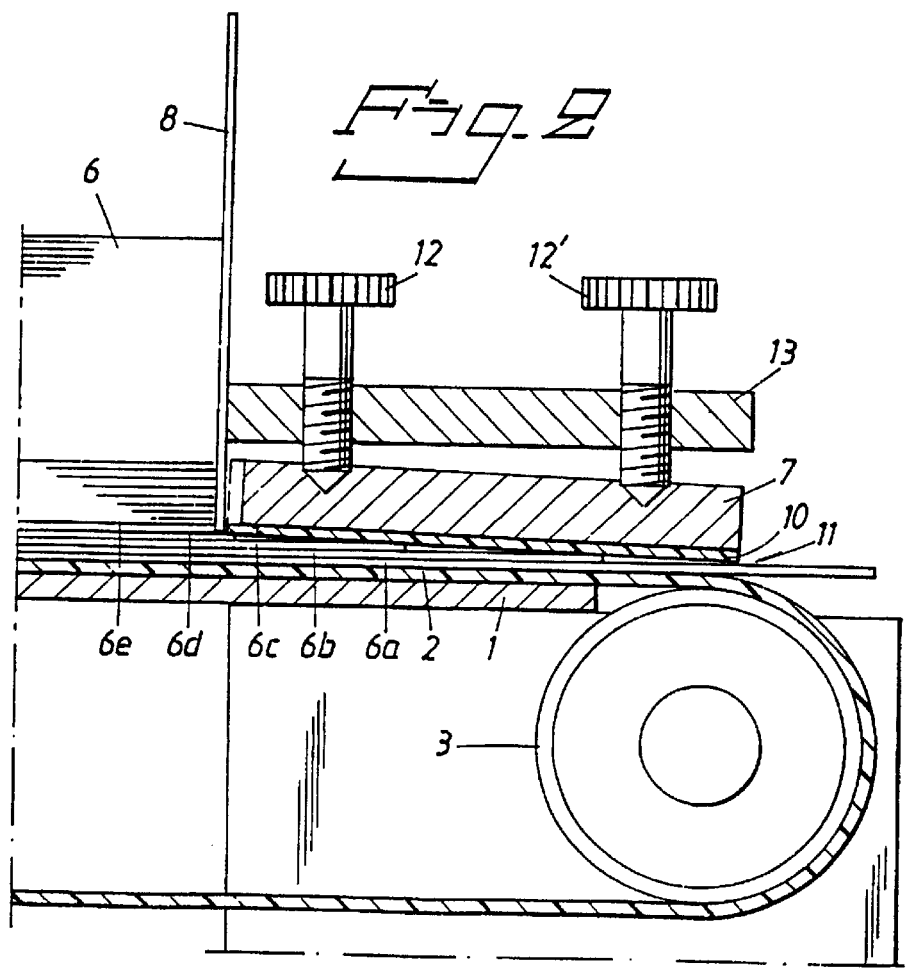

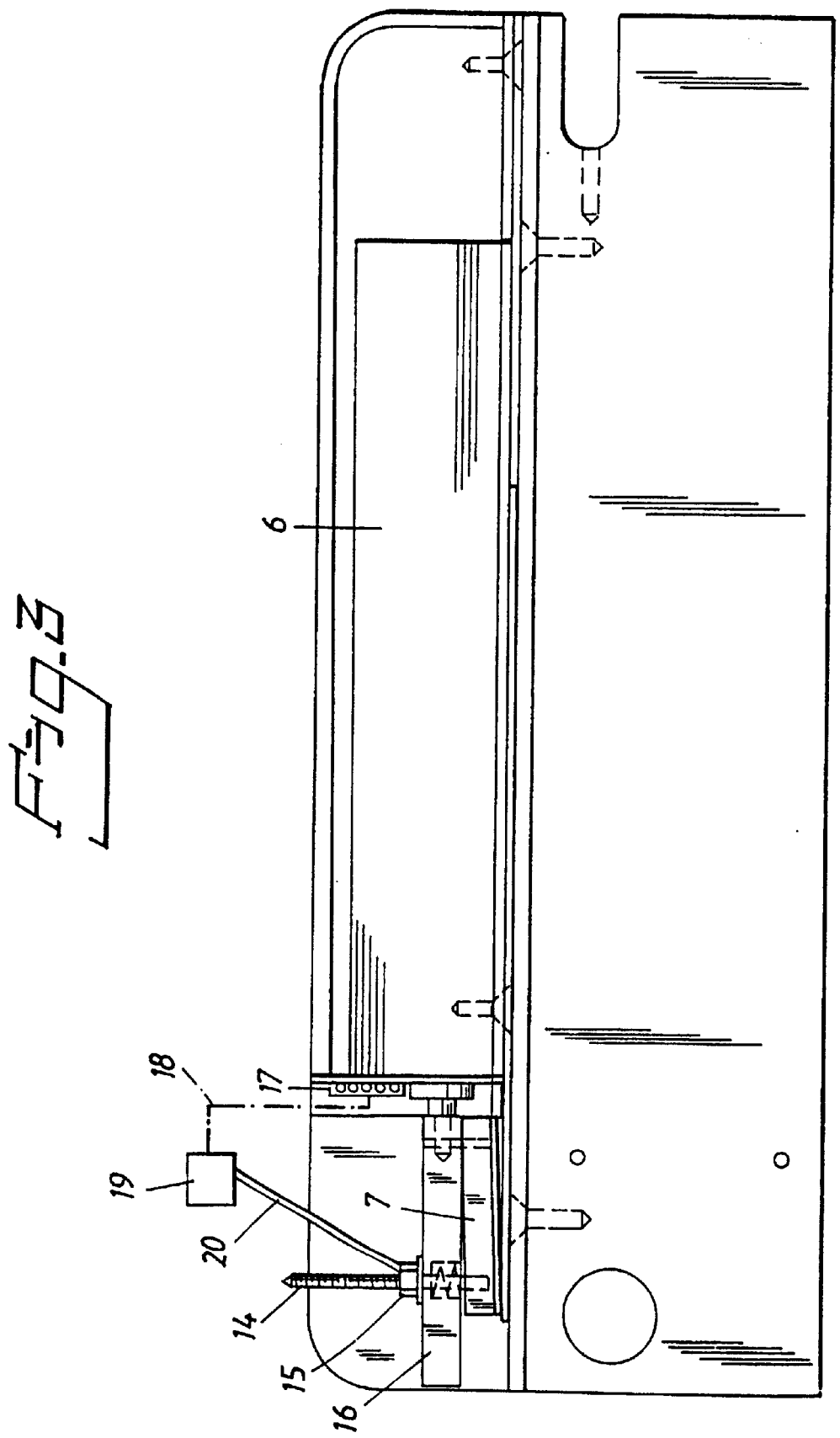

SINGLE SHEET FEEDING DEVICE AND A SCANNER EQUIPPED WITH SUCH A DEVICE

The present invention relates to a sheet feeding device for advancing paper sheets one by one and also to a scanner equipped with such a device.

Sheet feeders of this kind are used together with different types of paper handling machines in office environments for feeding sheets one by one for processing purposes, e.g. to read the sheets in a scanner.

One problem with known devices in this field is that they have either become too complicated to manage a single-sheet feeding function or have become relatively unreliable and often fail to feed the sheets correctly, e.g. feed several sheets at one and the same time. Machines exist that are both complicated and unreliable.

Scanning often requires paper sheets to be scanned from a sheet stack which contains paper of mutually different thick nesses. This creates further difficulties with regard to smooth uninterrupted feeding of the sheets without requiring excessively complicated arrangements to this end.

U.S. Pat. No. 4,606,535 teaches a sheet feeder constructed in accordance with known technology and including a feed opening defined between a feed belt and an inclined anvil or counter-pressure surface. The belt runs freely without being supported and can flex away under the pressure of paper sheets fed in towards the feed opening and pressed in between the anvil surface and one of the belt drive wheels. The belt takes a slight S-shape and it is difficult to control the number of sheets that shall pass through the feeder at one and the same time. The arrangement is particularly unsuitable for use when the sheets have mutually different thicknesses. Also described in U.S. Pat. No. 4,606,535 is a sheet feeder that is intended to eliminate the deficiencies of the afore described known feeder. This has been achieved with a sheet feeder in which a stack of sheets ready to be fed through the feeder are inclined relative to the horizontal plane, at an angle of about 60°. The anvil surface or the sheet holding device, or retarder, has been made resilient. In an attempt to enable sheets to be fed singly even when the thickness of the sheets vary, the sheet holding device has been provided with a large number of separate anvil or friction devices each of which is resiliently supported per se with a spring force that is mutually different for each anvil surface. The different spring constants must be accurately adapted in order for these devices to function in the manner intended and in the case of a number of embodiments, it is necessary to replace certain parts at regular intervals due to the large amount of wear on said parts.

Described in U.S. Pat. No. 3,831,928 is a feeder which is intended to reliably feed sheets one at a time and to enable sheets of mutually different thicknesses to be fed through the feeder. In this case, the belt runs between two rollers, and a further roller is provided to give support behind the belt in the infeed of the actual feed opening, whereas the remainder of the belt is unsupported. To enable sheets of different thicknesses to be fed one at a time, one side of the feed opening is defined by a pivotal sheet restraining or retarding mechanism. The large inlet angle that is formed in the infeed opening with this mechanism means that the components included in the mechanism must be adapted relative to one another with great precision in order to achieve single-sheet feeding. This applies partly to the relative distances between the components, secondly the strength of the springs that actuate the pivoted element, and thirdly the frictional coefficients of the driving surfaces. The principle of using a reciprocatingly pivoting mechanism makes the feed arrangement complicated and sensitive to disturbances. The apparatus also requires an intermittent sheet feeding sequence.

Described in U.S. Pat. No. 3,838,851 is a paper sheet feeding device in which the sheets are advanced with the aid of feed rollers. No feed belts are used. This device is not adapted to feed sheets of mutually different thicknesses.

As seen against this background, the object of the present invention is to provide a sheet feeder which although being of primarily simple construction is, nevertheless, able to feed sheets one by one even when the sheets vary in thickness.

This object has been achieved in accordance with the invention with a sheet feeder of the kind defined in the preamble of claim 1 that has the characteristic features set forth in the characterizing clause of said claim.

Because the gape, or width, of the sheet feed opening, where one side of the opening is defined by a sheet feeding belt that is supported by a rigid surface in the region of said opening, there is obtained a well-defined opening that can be adjusted so that only one sheet will be fed at a time, even when the thickness of the sheets varies.

In a preferred embodiment of the invention, either the sheet restraining or retarding device or the feed belt, or preferably both, is, are, resiliently yieldable. This facilitates adaptation of the sheet feeder to sheets of mutually different thicknesses, since an advancing sheet is able to press away one or both of these components. The elastic yieldability of said component, or components, is achieved by using a resilient material. This is a simple and reliable method of achieving the resilient yieldability.

Ideally, the feed belt and the sheet restraining or retarding device will be made of mutually the same material, which makes it easier to achieve the same resiliency in both components and provides the same coefficient of friction between the belt and a sheet as that between the restraining device and a sheet, this coefficient of friction preferably being high.

According to another preferred embodiment, the stack of sheets from which the sheets shall be fed is placed on a feed table adjacent the sheet feed opening, wherein the feed belt extends over at least half of the extension of the table in the feed direction, preferably over the full extension of the table. Because of its length, the feed belt is able to advance paper sheets of different sizes since the belt will also reach and entrain sheets of smaller formats than the other sheets and that have been placed in the "wrong" end of the sheet stack. This is highly beneficial, since when paper is fed to a scanner the sheets will often vary in size in addition to varying in thickness and quality.

Ideally, the feed opening defined between the belt and the sheet restraining or retarding device is wedge-shaped. In one preferred embodiment, the aforesaid feed opening has certain given dimensions and dimension relationships that optimize the possibility of feeding sheets of mutually different thicknesses one at a time in a problem-free manner.

The afore described embodiments and other advantageous embodiments of the inventive sheet feeder will be apparent from the Claims dependent on Claim 1.

According to one special aspect of the invention, a scanner is equipped with an inventive sheet feeder. It is precisely with this application of the invention together with a scanner that the advantages achieved by the inventive sheet feeder find special value.

The invention will now be described in more detail with reference to preferred embodiments thereof and also with reference to the accompanying drawings, in which FIG. 1 is a longitudinal sectioned view of a sheet feeder constructed in accordance with a preferred embodiment of the invention;

FIG. 2 is a longitudinal sectioned view of part of the sheet feeder shown in FIG. 1; and FIG. 3 is a side view of an alternative embodiment of an inventive sheet feeder.

The sheet feeder illustrated in FIG. 1 is comprised of a sheet feeding table 1 and a feed belt 2 which runs around the table 1 over a drive roller 3 and an idle roller 4, this latter roller including a device for adjusting its position in the transport direction so as to enable the belt to be stretched. The upper run of the feed belt slides over the feed table and is supported by said table along essentially the whole of its length. A stack of sheets 6 from which sheets are to be fed is placed on the feed table with the bottom-most sheet resting directly on the table and on the belt that runs on the upper side of the table. The direction of movement of the belt is indicated by the arrows A. Located on the right of FIG. 1 is the actual sheet feeder, which in addition to the feed belt 2 also includes a sheet restraining or retarding element in the form of an inclined plate 7. Provided on the side of the plate 7 proximal to the sheet stack 6 is a stop plate 8 which functions to prevent the major part of the sheet stack from moving. The bottom sheet in the stack is fed by the belt 2 to the right in the Figure to a scanner 9, which is shown symbolically in the Figure.

The actual sheet feeder is shown in larger scale in FIG. 2. The stop plate 8 extends down towards the conveyor belt and terminates to leave a gap corresponding to the thickness of from three to five sheets, i.e. a thickness from some tens of a millimetre up to some millimetres, depending on sheet thickness. The inclined plate 7 forms a small angle with the conveyor belt 2 and defines therewith a wedge-shaped space which has an inlet gape of about 0.3–3 mm, preferably about 1 mm, and an outlet gape of about 0.1–0.3 mm that corresponds approximately to the thickness of the thinnest sheet in the stack. The wedge-shaped feed opening has a length in the order of 30–100 mm, suitably about 50 mm. The slope ratio is in the range of 1:200 to 1:20 and will preferably be about 1:50.

That surface of the inclined plate 7 that lies proximal to the sheet is covered or coated at 10 with an elastic material of high coefficient of friction to paper, such as silicone rubber, for instance. The same material is used in the conveyor belt 2. Because of the elasticity of the rubber covering 10 and of the feed conveyor 2, when a sheet of greater thickness than the remaining sheets is fed-in, this sheet will be compressed by the covering 10 and/or the belt 2 so as to be able to pass through the gap.

The Figure shows the sheet stack 6 when the four bottom-most sheets arrive in the feed opening defined between the belt 2 and the plate 7. The very bottom-most sheet is pulled by friction with the belt 2 in towards the outfeed opening 11 and out through said opening. The bottom sheet 6a is therewith entrained into the feed opening, with the sheets 6b–d lying immediately above the bottom sheet 6a. Because the gape of the feed opening decreases, the sheets are drawn into the feed opening to different extents and lie against the friction covering 10 and retained in this position whilst the sheet 6a is fed out. When this sheet has left the sheet feeder, the whole of the sheet stack will fall down to an extent corresponding to the thickness of the sheet 6a and the next sheet 6b can be fed through the outfeed opening 11. The sheets 6c, 6d next in line will therewith be fed into the feed opening to a corresponding extent at the same time as the next sheet 6e is fed uppermost into the sheet feed opening.

The gape of the feed opening corresponds to the thickness of the thinnest sheet in the stack and when it is the turn of a thicker sheet to be fed out, this sheet is compressed by the elastic surfaces acting on respective sides of the sheet, as earlier mentioned.

The plate 7 is adjustably mounted by means of two adjuster screws 12, 12' fastened in the plate 7, wherein each of said screws can be screwed down or backed-off in a fixed plate 13, therewith to adjust the angle of the plate 7 and also the gape of the feed opening.

FIG. 3 is a schematic illustration in side view of a sheet feeder in which the plate is adjusted by an automatic control means. In the illustrated embodiment, the inclined plate 7 defining one side of the feed opening includes an adjuster screw 14 and an adjuster nut 15, said nut bearing against a pressure plate 16 which lies against the plate 7. Rotation of the nut 15 will urge the pressure plate 16 upwards or downwards, so as to change the angle of the feed opening.

Facing towards the sheet stack 6 is an optical detector 17 in the form of a light ramp. The light ramp detects the position of the top sheet in the stack 6. The level of the top sheet is an indication of the weight of the sheet stack 6 and therewith the braking force exerted by the stack 6 on the bottom-most sheet. For the feeder to function optimally, the smallest gap in the sheet feed opening will preferably be smaller the larger the braking force. The sensed level of the uppermost sheet in the sheet stack 6 is represented with a signal value that controls a motor 19 via a signal line 18. The motor 19 is drivingly connected to the nut 15 by means of a drive connection 20 shown symbolically in the Figure. The motor 19 turns the nut 15 so as to change the angle of the feed opening in relation to the height of the sheet stack. The smallest gape is changed by increasing the angle of the feed opening. Alternatively, the angle of the feed opening can be changed by constructing the control so as to set the smallest gape by pure translatory movement of the plate 7.

What is claimed is:

1. A sheet feeder for advancing paper sheets one by one, comprising
    at least one traveling feeder belt having an outer side that defines a feed plane;
    a belt support which remains stationary during operation of the feeder, said belt support being substantially rigid and substantially flat; and
    a sheet restraining or retarding element which remains stationary during operation of the feeder, said restraining or retarding element having a friction surface that faces towards the feed plane and is spaced therefrom, wherein the friction surface and the feed plane together define a feed opening whose gape decreases in a feed direction, the feeder belt runs on said belt support at least in the region of the feed opening, and said belt support extends along more than half of the feed opening in the feed direction.

2. A scanner equipped with the sheet feeder according to claim 1.

3. A sheet feeder according to claim 1, wherein the belt support is comprised of a feed table on which a sheet stack can be stored for feeding of the sheets, wherein the table has a length and a width that will accommodate the maximum sheet size for which the feeder is intended, and wherein the feed belt extends over at least half the full extension of the feed table in the feed direction.

4. A sheet feeder according to claim 3 wherein the feed belt extends over the full extension of the feed table.

5. A sheet feeder according to claim 1, in which at least said outer side of said feed belt or said friction surface is elastically pliable.

6. A sheet feeder according to claim 5, wherein said sheet restraining or retarding element has a part forming said friction surface and the feed belt and/or the part of said sheet restraining or retarding element forming the friction surface is/are comprised of an elastic material.

7. A sheet feeder according to claim 6, in which the feed belt and that part of the sheet restraining or retarding element which forms the friction surface are both made of said elastic material; and in that said elastic material has a high coefficient of friction relative to paper.

8. A sheet feeder according to claim 5, wherein said sheet restraining or retarding element has a part forming said friction surface, and the feed belt and that part of the sheet restraining or retarding element which forms the friction surface are made of the same material.

9. A sheet feeder according to claim 8 wherein said same material has a high coefficient of friction relative to paper.

10. A sheet feeder according to claim 1, in which the feed opening is wedge-shape with a pointed end of the opening located in the feed direction such that the gape of the feed opening will successively decrease in the feed direction.

11. A sheet feeder according to claim 10, in which the feed opening has an extension in the feed direction in the range of 30–100 mm, a largest gape in the range of 0.3–5 mm, and a largest ratio of gape to extension in the feed direction of from 1:200 to 1–20.

12. A sheet feeder according to claim 11, in which said extension is about 50 mm, said largest gape of the feed opening is about 2 mm and said ratio is about 1:50.

13. A sheet feeder according to claim 12, provided with means for adjusting the distance between the feed plane and the friction surface and/or for adjusting the ratio between the largest gape of the feed plane and the extension in the feed direction.

14. A sheet feeder according to claim 13, which includes automatic control means for actuation if said adjustment means.

15. A sheet feeder according to claim 13, in which said control means includes optical detecting means for sensing a height of the sheet stack drive means for driving said adjustment means, and signaling means for transmitting signals to the drive means from the detection means for adjusting the adjustment means by way of said drive means in response to a signal representing the height of the sheet stack.

16. A sheet feeder according to claim 12, provided with at least one adjuster for changing the distance, between the feed plane and the friction surface and/or for changing the ratio between the largest gape of the feed plane and the extension in the feed direction.

17. A sheet feeder according to claim 16, which includes an automatic control system for actuation of said at least one adjuster.

18. A sheet feeder according to claim 16, in which said control system includes an optical detector for sensing a height of the sheet stack, a drive motor for driving said at least one adjuster, and a signal carrier for transmitting signals to the drive motor from the detector for adjusting the at least one adjuster by way of said drive motor in response to a signal representing the height of the sheet stack.

* * * * *